US012585497B2

(12) United States Patent
Toub et al.

(10) Patent No.: US 12,585,497 B2
(45) Date of Patent: Mar. 24, 2026

(54) AMBIENT COOPERATIVE CANCELLATION WITH GREEN THREADS

(71) Applicant: Microsoft Technology Licensing, LLC, Redmond, WA (US)

(72) Inventors: Stephen Harris Toub, Winchester, MA (US); David Charles Wrighton, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 487 days.

(21) Appl. No.: 18/310,434

(22) Filed: May 1, 2023

(65) Prior Publication Data

US 2024/0370296 A1 Nov. 7, 2024

(51) Int. Cl.
G06F 9/46 (2006.01)
G06F 9/48 (2006.01)

(52) U.S. Cl.
CPC .................................. G06F 9/4881 (2013.01)

(58) Field of Classification Search
CPC .................................................... G06F 9/4881
USPC .......................................................... 718/106
See application file for complete search history.

(56) References Cited

U.S. PATENT DOCUMENTS

| | | | | | |
|---|---|---|---|---|---|
| 6,560,626 | B1 * | 5/2003 | Hogle | ................... | G06F 9/4812 |
| | | | | | 719/310 |
| 8,701,096 | B2 * | 4/2014 | Iyer | ......................... | G06F 8/443 |
| | | | | | 717/151 |

| | | | | | |
|---|---|---|---|---|---|
| 9,043,749 | B2 * | 5/2015 | Duffy | ...................... | G06F 9/466 |
| | | | | | 717/106 |
| 9,201,688 | B2 * | 12/2015 | Michailov | ............. | G06F 9/4881 |
| 9,582,312 | B1 * | 2/2017 | Karppanen | ......... | G06F 11/3466 |
| 9,880,860 | B2 * | 1/2018 | Syme | ....................... | G06F 9/461 |
| 2003/0065709 | A1 * | 4/2003 | Jordan | .................. | G06F 9/5027 |
| | | | | | 709/248 |
| 2005/0125802 | A1 * | 6/2005 | Wang | ...................... | G06F 9/542 |
| | | | | | 712/E9.032 |
| 2006/0294347 | A1 * | 12/2006 | Zou | ........................ | G06F 9/3009 |
| | | | | | 712/E9.032 |
| 2011/0130171 | A1 * | 6/2011 | Manohar | ................... | G06F 1/12 |
| | | | | | 455/571 |

(Continued)

OTHER PUBLICATIONS

Anonymous, "Cancellation in managed threads", Retrieved from the Internet: URL:https://learn.microsoft.com/en-us/dotnet/standard/threading/cancellation-in-managed-threads#cooperation-between-library-code-and-user-code, Jan. 9, 2022, 11 pages.

(Continued)

*Primary Examiner* — Mehran Kamran
(74) *Attorney, Agent, or Firm* — Workman Nydegger

(57) ABSTRACT

A device may queue a thread for execution by a thread pool, including configuring an ambient context with a cancellation token. Based on a call of a synchronous method by the thread, the device may determine that the thread uses a green threads model and identify the cancellation token from the ambient context. Based on the thread using the green threads model, the device may call an asynchronous method that uses an asynchronous operation to perform a task of the synchronous method, including passing the asynchronous method the cancellation token. Based on identifying a state change of the cancellation token, the device may terminate the asynchronous operation.

20 Claims, 5 Drawing Sheets

(56) References Cited

U.S. PATENT DOCUMENTS

| | | | | |
|---|---|---|---|---|
| 2012/0079463 A1* | 3/2012 | Freeman | ................ | G06F 8/456 |
| | | | | 717/136 |
| 2012/0246624 A1* | 9/2012 | Halliday | ............ | G06F 11/3698 |
| | | | | 717/129 |
| 2012/0324431 A1* | 12/2012 | Toub | ....................... | G06F 8/456 |
| | | | | 717/159 |
| 2017/0364393 A1* | 12/2017 | Finnigan | ............... | G06F 9/4881 |
| 2020/0159641 A1* | 5/2020 | Hellyer | ............... | G06F 11/3636 |
| 2022/0197718 A1* | 6/2022 | Drepper | ............... | G06F 9/3871 |
| 2024/0345879 A1* | 10/2024 | Chen | ..................... | G06F 9/4843 |
| 2024/0370296 A1* | 11/2024 | Toub | .................... | G06F 9/4881 |

OTHER PUBLICATIONS

International Search Report and Written Opinion received for PCT Application No. PCT/US2024/026126, mailed on Oct. 25, 2024, 13 pages.

Marlow, Simon, "Parallel and Concurrent Programming in Haskell", 18th International Conference, 2012, pp. 339-401.

International Preliminary Report on Patentability received for PCT Application No. PCT/US2024/026126, mailed on Nov. 13, 2025, 08 pages.

\* cited by examiner

100

200

300

400

500

AMBIENT COOPERATIVE CANCELLATION WITH GREEN THREADS

BACKGROUND OF THE INVENTION

In computer science, asynchronous programming is a way for a context (e.g., a main thread) to initiate an asynchronous operation (e.g., by calling a method) without blocking to wait for that operation to complete. One application of asynchronous programming is to avoid tying up limited computing resources. For example, there are overheads (e.g., memory resources, processing resources) associated with creating, operating, and destroying each thread in a computing system. To mitigate these overheads and to prevent the overconsumption of computing resources (e.g., to avoid the creation of an unbounded number of threads, to avoid creating and destroying a thread for each requested operation), operating systems create a pool of a bounded number of threads that are available to perform work, such as input/output operations, on behalf of other threads. Asynchronous techniques enable multiple operations to be assigned to each thread in the pool, effectively multiplexing operations across the threads in the pool.

One model used in many contemporary programming languages to express asynchronous operations is associating a "callback" with a task. A callback is a method that gets called after completing the task. One way to register a callback is continuation passing, in which a callback is passed to a method, and the method calls that callback once it completes its work. The use of callbacks and continuation passing allows a series of asynchronous operations to be chained in a way that ensures they are executed in the correct order. Callbacks can be explicitly added by a programmer. For example, in the .NET framework (MICROSOFT COR-PORATION, Redmond, Washington), an 'async' method allows a program to execute non-blocking operations, such as network or disk access, without blocking the thread initiating the operation. When an async method is called, it returns a Task object representing the ongoing operation. The method then continues to execute in the background while the calling code can continue with other tasks. Once the async method task is completed, it will return a result or throw an exception. The calling code can use an 'await' keyword to suspend execution until the operation completes and a result is available. Additionally, or alternatively, callbacks can be added via compiler transformations.

At times, it may be desirable to cancel an asynchronous task once initiated (e.g., to stop long-running operations such as a network request or a file transfer when it is no longer needed). One mechanism to cancel an asynchronous task is with cancellation tokens, which provide a way for a running operation to be notified that it should be canceled. A source context creates a cancellation token and passes that token to asynchronous operation(s) (e.g., an argument to an async method). Each asynchronous operation can, in turn, can pass a received cancellation token (either individually or combined with other tokens) to further asynchronous operation(s). To request cancellation the source context cancels the token, which effectively propagates a cancellation signal to any operations that are listening for it. For example, these operations may poll the cancellation token periodically to see if cancellation has been requested, or register a callback that is invoked if cancellation has been requested, and exit early when cancellation is requested (and call a registered callback method, for example).

The subject matter claimed herein is not limited to embodiments that solve any disadvantages or that operate only in environments such as those described supra. Instead, this background is only provided to illustrate one example technology area where some embodiments described herein may be practiced.

SUMMARY OF THE INVENTION

In some aspects, the techniques described herein relate to methods, systems, and computer program products, including: queuing a thread for execution by a thread pool, including configuring an ambient context with a cancellation token; based on a call of a synchronous method by the thread, determining that the thread uses a green threads model; and identifying the cancellation token from the ambient context; based on the thread using the green threads model, calling an asynchronous method that uses an asynchronous operation to perform a task of the synchronous method, including passing the asynchronous method the cancellation token; and based on identifying a state change of the cancellation token, terminating the asynchronous operation.

In some aspects, the techniques described herein relate to methods, systems, and computer program products, including: queuing a thread for execution by a thread pool; based on a call of a synchronous method by the thread, determining that the thread does not use a green threads model; and based on the thread not using the green threads model performing a task of the synchronous method.

This Summary is provided to introduce a selection of concepts in a simplified form that are further described below in the Detailed Description. This Summary is not intended to identify key features or essential features of the claimed subject matter, nor is it intended to be used as an aid for determining the scope of the claimed subject matter.

BRIEF DESCRIPTION OF THE DRAWINGS

To describe how the advantages and features of the systems and methods described herein can be obtained, a more particular description of the embodiments briefly described supra will be rendered by reference to specific embodiments thereof, which are illustrated in the appended drawings. Understanding that these drawings depict only typical embodiments of the systems and methods described herein and are not, therefore, to be limiting of their scope, certain systems and methods will be described and explained with additional specificity and detail through the use of the accompanying drawings in which.

DETAILED DESCRIPTION OF THE INVENTION

Figure 1:
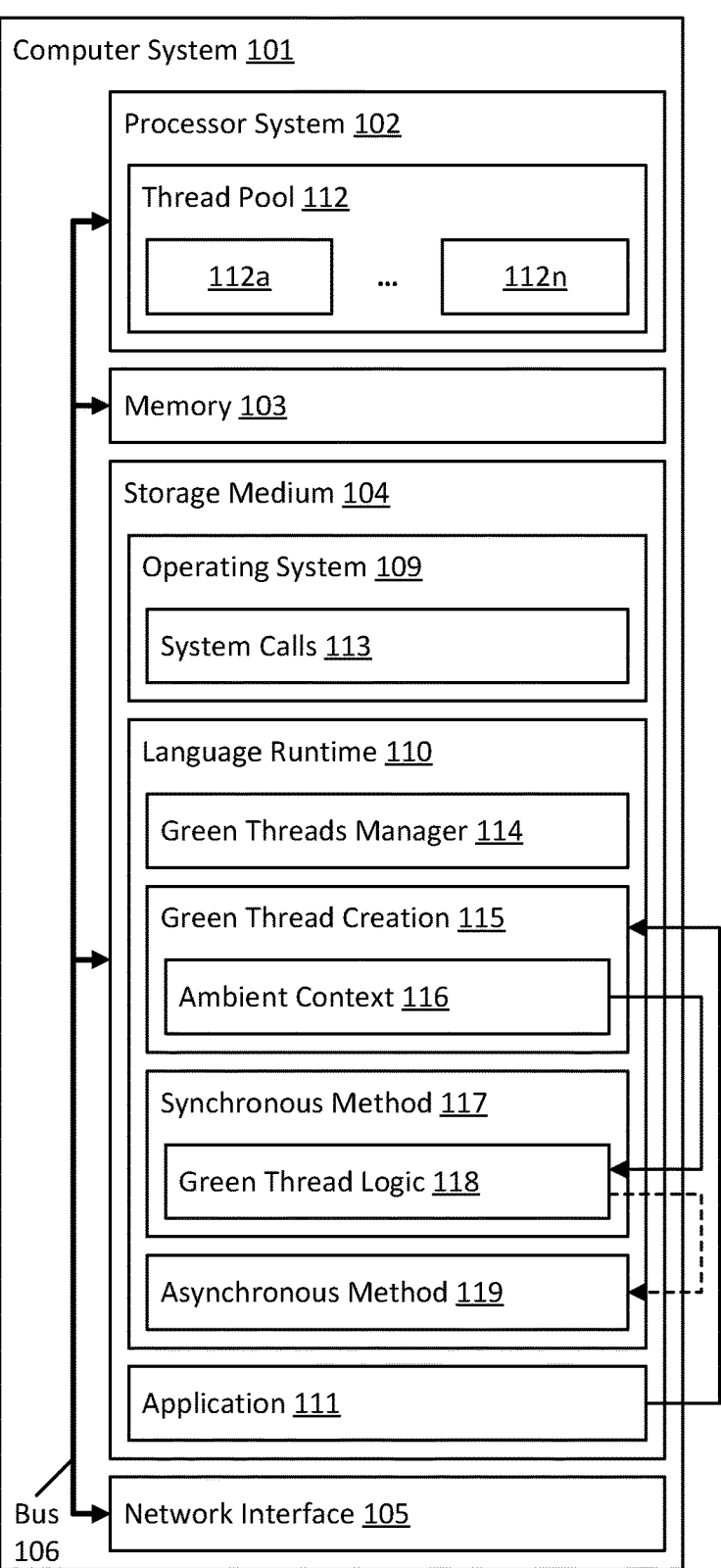
FIG. 1 illustrates an example of a computer architecture that facilitates ambient cooperative cancellation with green threads.

In this description, and in the claims, the term "callback model" refers to any programming model in which the asynchrony of a thread's operations is specified explicitly using callbacks and continuation passing. In this description, and in the claims, the term "asynchronous thread" refers to any thread that uses a callback model for asynchrony. In this description, and in the claims, the term "green threads model" refers to any programming model in which the asynchrony of a thread's operations is implied (e.g., in which a runtime translates synchronous calls into asynchronous ones). In this description, and in the claims, the term "green thread" refers to any thread that relies on a green threads model for asynchrony.

Some languages, such as the GO programming language (GOOGLE LLC, Mountain View, California), include the concept of green (or virtual) threads. Green threads are a programming abstraction that allows for multiple virtualized threads within a single operating system (OS) thread. In a green threads model, a developer writes code using synchronous calls. A language runtime then intercepts those synchronous calls and translates them into asynchronous ones. For example, this involves the runtime determining that a green thread is initiating a synchronous operation, e.g., by calling a synchronous system call for an input/output (I/O) operation, the runtime saving the green thread's state (e.g., by copying stack state to another location), and the runtime initiating an asynchronous operation on the green thread's behalf (e.g., by calling an asynchronous system call for the I/O operation). This allows an associated OS thread to continue executing while the green thread blocks. Later, when the asynchronous work that was initiated on the green thread's behalf completes and an OS thread is available, the runtime restores the green thread's saved state onto that OS thread and resumes execution of the green thread. Effectively, because a synchronous operation was converted into an asynchronous one, the green thread blocks for completion of the synchronous operation without blocking an OS thread with which that thread was associated.

At least some embodiments described herein compose a callback model, such as the asynchronous programming model used by the .NET framework, with a green threads model. For example, embodiments enable asynchronous threads and green threads to coexist. In this context, there are challenges with the cancellation of pending operations on green threads. For example, there is a challenge of how an asynchronous thread signals a green thread that the green thread's asynchronous operation(s) (e.g., that a language runtime has converted from synchronous operation(s)) should be canceled. This is because green threads only make synchronous calls and thus do not use an explicit cancellation model, so there is no way for a synchronous thread to pass a cancellation token to a green thread.

To address these challenges, at least some embodiments described herein expand the use of cancellation tokens, such as those supported by the .NET framework, to cover implicitly asynchronous threads (e.g., green threads) in addition to threads that expressly use asynchrony. For example, some embodiments described herein augment an application programming interface (API) that is used to start or queue a green thread to take a cancellation token as an argument. In these embodiments, this cancellation token is stored in the green thread's ambient context (e.g., the overall state associated with the green thread) in a manner that makes the token accessible to any code running on the green thread. These embodiments also instrument synchronous operations to use this ambient context to determine if the synchronous operation is executing a green thread. If the synchronous operation determines that it is not executing on a green thread, the operation proceeds using its synchronous implementation. If the synchronous operation determines that it is executing on a green thread, the operation delegates to a corresponding asynchronous operation while passing the asynchronous operation the cancellation token that is stored in the green thread's ambient context. In this manner, a developer can write synchronous code using existing synchronous methods without the impact of expressly dealing with cancellation in the programming model. This synchronous code may then be used with an ambient token that can cancel all the asynchronous operations involved.

Thus, the embodiments described herein compose a callback model and a green threads model while providing a mechanism for signaling to an asynchronous operation (e.g., which has been delegated by a synchronous operation of a green thread) that the operation has been canceled. This enables the composition of expressly specified asynchronous operations (e.g., using a callback model) with implicitly specified asynchronous operations (e.g., using a green threads model) and enables the cancellation of these composed operations. Additionally, by instrumenting synchronous operations so that they use a thread's ambient context to determine if they are executing on a green thread and delegate as needed, the embodiments described herein express cancellation using APIs that don't have any notion of cancellation in their signatures. This also avoids the need to expand these APIs, which already number in the thousands in modern languages such as the .NET framework.

FIG. 1 illustrates an example computer architecture 100 that facilitates ambient cooperative cancellation with green threads. As shown, computer architecture 100 includes a computer system 101 comprising a processor system 102 (e.g., a single processor or a plurality of processors), a memory 103 (e.g., system or main memory), and a storage medium 104 (e.g., a single computer-readable storage medium, or a plurality of computer-readable storage media), all interconnected by a bus 106. Computer system 101 may also include a network interface 105 (e.g., one or more network interface cards) for interconnecting to one or more other computer systems via a network.

The storage medium 104 is illustrated as storing computer-executable instructions implementing at least an OS 109 (e.g., WINDOWS, LINUX, MACOS, and the like), a language runtime 110 (e.g., .NET, JAVA, GO, PYTHON, and the like), and an application 111. In FIG. 1, OS 109 includes system calls 113 that OS 109 makes available for use by application 111 via language runtime 110. While FIG. 1 illustrates OS 109 and language runtime 110 as being separate, in embodiments, language runtime 110 is implemented, at least partially, by OS 109. In embodiments, application 111 comprises computer-executable code that is configured to utilize APIs provided by language runtime 110.

Processor system 102 is illustrated as executing a thread pool 112 that comprises a plurality of threads (e.g., thread 112a to thread 112n). These threads perform operations on behalf of software, including application 111, that executes at computer system 101. In some embodiments, thread pool 112 is managed by OS 109 directly. In other embodiments, thread pool 112 is managed by language runtime 110. In one example, thread pool 112 is a pool of threads (e.g., "worker" threads) that multiplex operations (e.g., I/O operations to access data on storage medium 104, or to access network interface 105) from a queue, including operations requested by application 111. In embodiments, operations are created via system calls 113. For example, a thread executing at thread pool 112 may initiate a synchronous read I/O operation by calling a 'Read' method within system calls 113, and a thread executing at thread pool 112 may initiate an asynchronous read I/O operation by calling a 'ReadAsync' method within system calls 113.

In the embodiments described herein, language runtime 110 supports explicitly specified asynchronous operations (e.g., a callback model). This means that language runtime 110 enables application 111 to queue work at thread pool 112 via a call to an asynchronous method 119. This includes enabling application 111 to pass a cancellation token to the asynchronous method 119 (e.g., for signaling the cancellation of an asynchronous operation initiated by the asynchronous method 119). In some embodiments, asynchronous method 119 is part of language runtime 110, and it utilizes system calls 113 to perform asynchronous work (e.g., by calling an asynchronous version of a system call, such as a ReadAsync method). In other embodiments, asynchronous method 119 is, itself, one of system calls 113.

Figure 2:
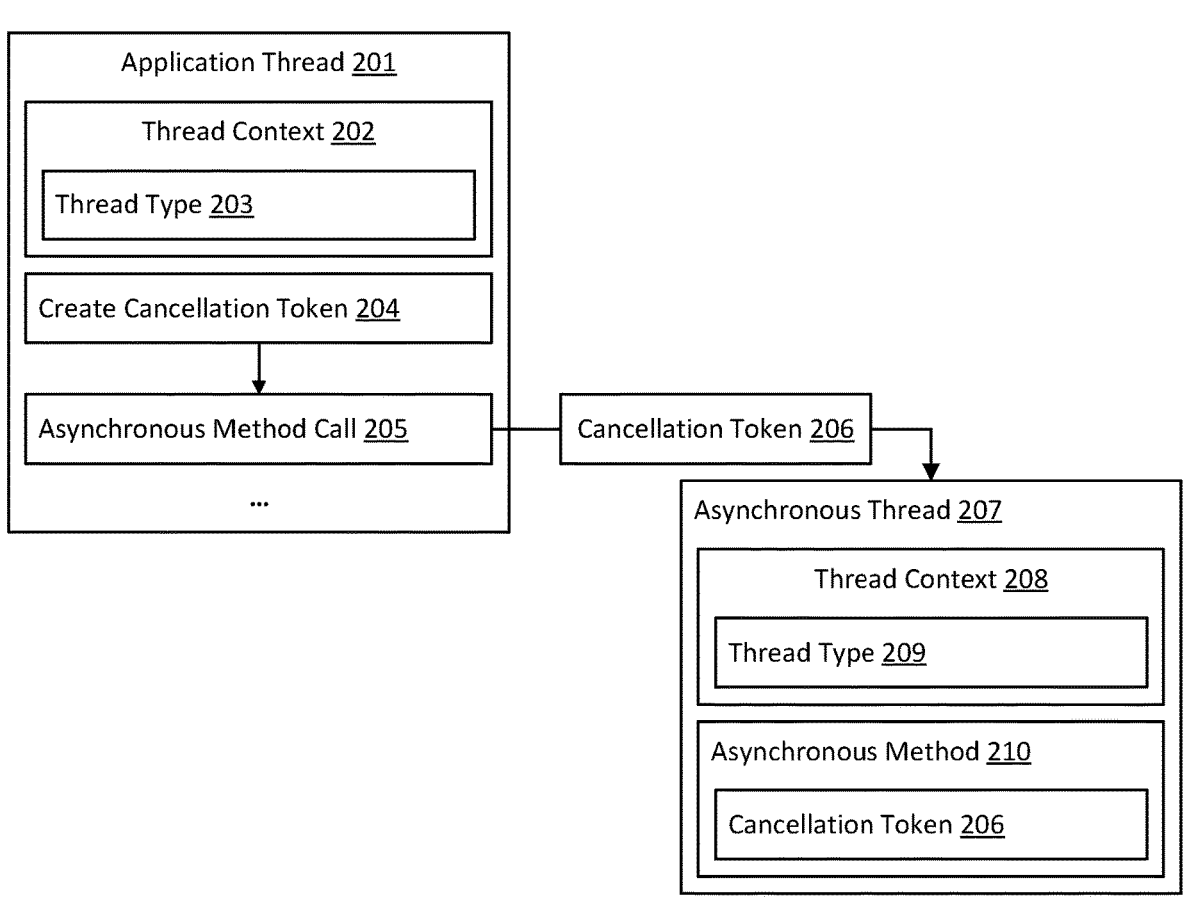
FIG. 2 illustrates an example of an asynchronous method call.

For example, FIG. 2 illustrates example 200 of an asynchronous method call, in which an application thread 201 (e.g., application 111) makes an asynchronous method call 205 to an asynchronous method 210. This results in the creation (e.g., by the language runtime 110) of an asynchronous thread 207 for execution at a thread pool (e.g., thread pool 112). In example 200, application thread 201 expressly creates a cancellation token 206 (e.g., create cancellation token 204) and passes that cancellation token 206 as part of the asynchronous method call 205. Thus, at asynchronous thread 207, asynchronous method 210 has direct access to cancellation token 206. This means that application thread 201 can cancel an asynchronous operation being performed by asynchronous thread 207 based on interacting with cancellation token 206 (e.g., by calling a 'Cancel' method of an object corresponding to cancellation token 206). Notably, in FIG. 2, application thread 201 has a thread context 202, indicating a thread type 203 of application thread 201, and asynchronous thread 207 has a thread context 208, indicating a thread type 209 of asynchronous thread 207. Thread contexts 202 and 208 are examples of "ambient" context because they are accessible to any code executing on the thread (e.g., code executing at application thread 201 can access thread context 202, and code executing at asynchronous thread 207 can access thread context 208).

As a non-limiting illustration, the .NET framework includes a 'CancellationTokenSource' type that serves two purposes. First, it returns a 'CancellationToken' object that can be passed as an argument of an asynchronous method call. Second, it provides a Cancel method that signals the cancellation of associated operations. Thus, an application can hand a CancellationToken to any entity that wants to listen for a cancellation signal, and when the Cancel method is called on the associated CancellationTokenSource object, any listening entities are notified. Example 1 demonstrates an example signature of a ReadAsync asynchronous method, which accepts a CancellationToken.

```
public Task<int> ReadAsync(byte[ ] buffer, int length, int offset,
    CancellationToken cancellationToken);
```

Notably, as demonstrated by Example 2, in the .NET framework, synchronous methods lack awareness of a CancellationToken.

```
public int Read (byte[ ] buffer, int length, int offset);
```

Example 2

If the Cancel method on a CancellationToken is called while an instance of ReadAsync that was passed that CancellationToken is in flight, that ReadAsync instance wakes from its I/O operation and completes with an 'OperationCanceledException,' which in turn propagates out to any entity awaiting the returned task.

In FIG. 1, language runtime 110 is illustrated as including a green threads manager 114, indicating that, in the embodiments described herein, language runtime 110 also supports implicitly specified asynchronous operations (e.g., a green threads model), in addition to supporting explicitly specified asynchronous operations (e.g., a callback model). This means that language runtime 110 also enables application 111 to queue work at thread pool 112 via a green thread that calls a synchronous method 117. In some embodiments, synchronous method 117 is part of language runtime 110, and it utilizes system calls 113 to perform synchronous work (e.g., by calling a synchronous version of a system call, such as a Read method). In other embodiments, synchronous method 117 is, itself, one of system calls 113.

In the embodiments described herein, language runtime 110 enables a composition of these two models, meaning that an application (e.g., application 111) can use both explicit asynchrony (callback model) and implicit asynchrony (green threads model). Because synchronous methods lack awareness of cancellation tokens, a challenge that exists when composing these models is that if an application uses synchronous methods with green threads, there is nowhere to pass a cancellation token (e.g., the CancellationToken object in the .NET framework).

To address these challenges, the embodiments described herein augment an API of language runtime 110 that is used to start or queue a green thread so that the API supports the concept of cancellation tokens. This includes augmenting the API to insert a cancellation token into the ambient context associated with a green thread. Thus, in FIG. 1, a green thread creation component 115 is illustrated as including an ambient context component 116 that identifies a cancellation token and inserts that cancellation token into a green thread's ambient context when creating or queuing that green thread.

In some embodiments, green thread creation component 115 receives the cancellation token from a calling context. As a non-limiting illustration, Example 3 demonstrates that a signature of a RunOnGreenThread method of the .NET framework could be augmented to accept a CancellationToken object.

```
public static Task RunOnGreenThread(Action action, CancellationToken
    cancellationToken)
{
    Thread t = GetOrCreateGreenThread( );
    t.GreenThreadCancellationToken = cancellationToken;
    t.GreenThreadAction = action;
    return Start(t);
}
```

In other embodiments, green thread creation component 115 generates the cancellation token itself and returns that cancellation token to the calling context.

In either case, ambient context component 116 stores the cancellation token in a manner that makes it accessible to any code running on the newly created/queues green thread. In one embodiment, ambient context component 116 stores the cancellation token on the global context of the thread. In some embodiments, ambient context component 116 also stores an indication that the thread has a green thread type.

As a non-limiting illustration, Example 4 demonstrates the creation of ambient context, including storing a cancellation token and an indication of a green thread type.

```
public class Thread
{
    public bool IsGreenThread { get; }
    public CancellationToken GreenThreadCancellationToken { get; }
    ...
}
```

The embodiments described herein also provide a mechanism to utilize this ambient context to substitute an asynchronous method implementation for an asynchronous equivalent when that asynchronous method implementation is executed on a green thread. One embodiment instruments a synchronous method (e.g., within system calls 113) with logic that utilizes the ambient context of the thread on which it is executing to determine whether it is executing on a green thread. If it is not executing on a green thread, the instrumentation logic proceeds with the method's synchronous implementation. If it is executing on a green thread, the instrumentation logic calls an asynchronous equivalent of the synchronous method using a cancellation token obtained from the thread's ambient context. For example, when called, a synchronous method (e.g., 'Read') uses ambient context to determine if it is executing on a green thread. If it is not executing on a green thread, the method proceeds with its synchronous implementation. If it is executing on a green thread, the method calls a synchronous implementation (e.g., 'ReadAsync') and passes the synchronous implementation a cancellation token obtained from the ambient context. In FIG. 1, this instrumentation logic is illustrated as green thread logic 118 of synchronous method 117.

As a non-limiting illustration, Example 5 illustrates how a synchronous Read method of the .NET framework could be instrumented, in accordance with the embodiments described herein, to employ ambient tread context (including an ambient CancellationToken) as part of its internal delegation to a corresponding asynchronous operation.

```
public Task<int> Read(byte[ ] buffer, int length, int offset)
{
    if (Thread.CurrentThread.IsGreenThread)
    {
        Task<int> task = ReadAsync(buffer, length, offset,
            Thread.CurrentThread.GreenThreadCancellationToken);
        return task.GetAwaiter( ).GetResult( );
    }
    ... // normal synchronous implementation
}
```

Figure 3:
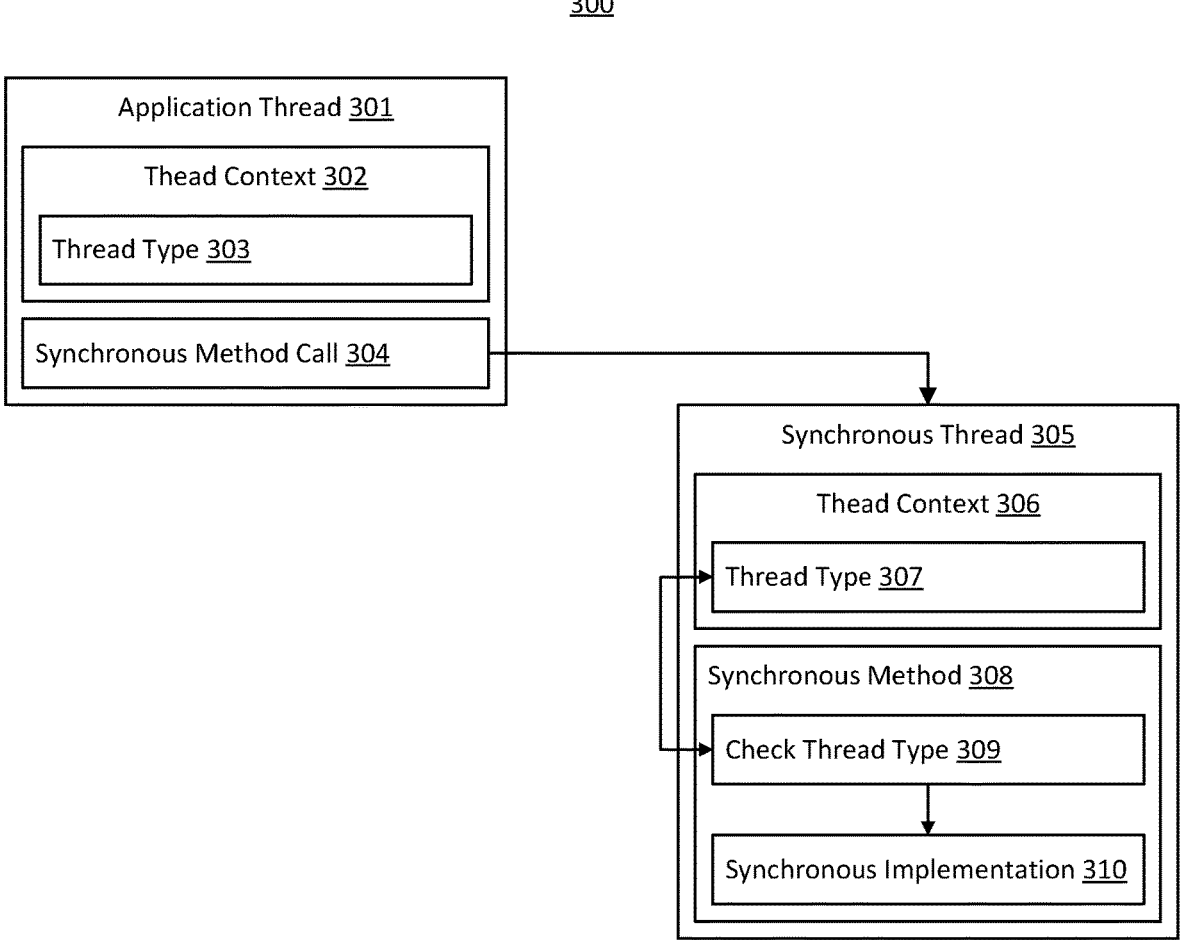
FIG. 3 illustrates an example of a synchronous method call in which the synchronous method continues synchronously based on ambient context.

FIG. 3 illustrates example 300 of a synchronous method call, in which a synchronous method continues synchronously based on ambient context. In example 300, an application thread 301 (e.g., application 111) makes a synchronous method call 304 to a synchronous method 308. This results in the creation (e.g., by the language runtime 110) of a synchronous thread 305 for execution at a thread pool (e.g., thread pool 112). Notably, in FIG. 3, application thread 301 has a thread context 302 (ambient context), which indicates a thread type 303 of application thread 301, and synchronous thread 305 has a thread context 306 (ambient context) that indicates a thread type 307 of synchronous thread 305. Here, thread type 307 indicates that synchronous thread 305 is not a green thread. Thus, when synchronous method 308 uses ambient context (e.g., thread context 306) to determine (e.g., green thread logic 118) whether it is executing on a green thread (check thread type 309), it determines it is not executing on a green thread and continues with a synchronous implementation 310.

Figure 4:
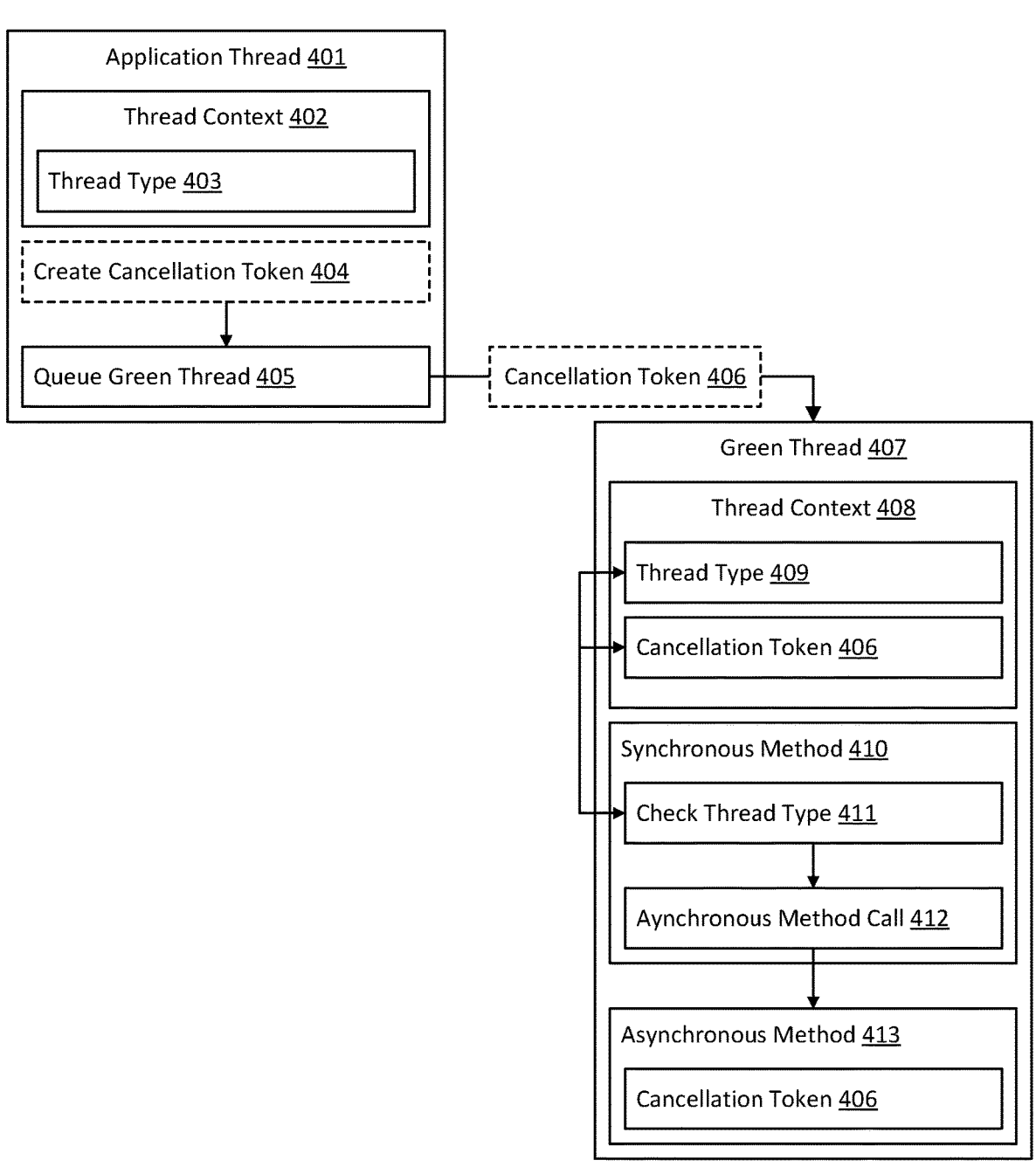
FIG. 4 illustrates an example of a synchronous method call in which the synchronous method calls an asynchronous implementation based on ambient context.

FIG. 4 illustrates example 400 of a synchronous method call, in which the synchronous method calls an asynchronous implementation based on ambient context. In example 400, an application thread 401 (e.g., application 111) queues a green thread (queue green thread 405) for the execution of a synchronous method 410. This results in the creation (e.g., by the language runtime 110) of a green thread 407 for execution at a thread pool (e.g., thread pool 112). Like examples 200 and 300, in FIG. 4, each of application thread 401 and green thread 407 has a thread context 402, 408 (ambient context) that indicates, e.g., a thread type 403, 409 of the thread. However, unlike examples 200 and 300, in example 400, thread context 408 also includes a cancellation token 406. In some embodiments, cancellation token 406 is generated by green thread creation component 115 as part of the creation/queuing of green thread 407. In other embodiments, and as illustrated in example 400, application thread 401 creates the cancellation token (create cancellation token 404) and passes that token when queuing green thread 407. Here, thread type 409 indicates that green thread 407 is a green thread. Thus, when synchronous method 410 uses ambient context (e.g., thread context 408) to determine (e.g., green thread logic 118) whether it is executing on a green thread (check thread type 411), it determines it is executing on a green thread. Thus, synchronous method 410 calls an asynchronous method 413 (asynchronous method call 412), passing it the cancellation token 406 (as obtained from thread context 408).

In this manner, a developer can write synchronous code without worrying about the impact of cancellation in the programming model, using synchronous methods that have existed for many years. However, language runtime 110 ensures that this synchronous code is implemented asynchronously when it can be and in a manner that is compatible with cancellation. As a non-limiting illustration, a developer may utilize synchronous Read and Write methods, as shown in Example 6:

```
public void Copy( )
{
    using Stream source = ...;
    using Stream destination = ...;
    byte[ ] buffer = new byte[1024];
    int n;
    while ((n = source.Read(buffer, 0, buffer.Length)) != 0)
        destination.Write(buffer, 0, n);
}
``` and this synchronous code may then be used with a cancellation token that's capable of canceling all the synchronous operations involved, as shown in Example 7.

```
var cts = new CancellationTokenSource( );
Task t = Task.RunOnGreenThread(Copy, cts.Token);
...
cts.Cancel( );
```

As an alternative to instrumenting synchronous methods with logic to determine if they are executing on a green thread, another embodiment (e.g., performed by language runtime 110) detects a call to a synchronous method. Then, prior to executing the call, language runtime 110 uses the ambient context of a thread making the call to determine whether the thread that made the call is a green thread. If the thread is not a green thread, language runtime 110 proceeds with the call to the synchronous method as would be typical. If the thread is a green thread, however, language runtime 110 proceeds with a call to an asynchronous equivalent using a cancellation token obtained from the thread's ambient context.

In some embodiments, ambient context is stored as part of a thread itself (e.g., thread context 202, 208, 302, 306, 402, 408). In other embodiments, ambient context is stored apart from the thread. These embodiments enable cancellation to flow into the asynchronous operation used. For example, the .NET framework has the concept of an 'AsyncLocal,' which is a state associated with a thread. In embodiments, a construct, such as an AsyncLocal, is extended to flow ambiently with asynchronous operations, such that any threads that run code associated with an operation also see that state associated with the thread. Thus, as an alternative to having a cancellation token stored on a green thread, it could be stored in an AsyncLocal<CancellationToken> that is configured in such a way that it's both accessible to synchronous operations running on the green thread but also then visible to any other threads the executed asynchronous operations run on.

In embodiments, when an asynchronous task that was initiated as part of a green thread based on ambient context is canceled, its cancellation is propagated via an exception, such as an "OperationCanceledException" in the .NET framework, that propagates out to any entity listening for the exception.

Embodiments are now described in connection with FIG. 5, which illustrates a flow chart of an example method 500 for utilizing ambient context to convert a synchronous operation to an asynchronous operation when the synchronous operation executes on a green thread. In embodiments, instructions for implementing method 500 are encoded as computer-executable instructions (e.g., language runtime 110) stored on a computer storage media (e.g., storage medium 104) that are executable by a processor (e.g., processor system 102) to cause a computer system (e.g., computer system 101) to perform method 500.

The following discussion now refers to a method and method acts. Although the method acts are discussed in specific orders or are illustrated in a flow chart as occurring in a particular order, no specific ordering is required unless expressly stated or required because an act is dependent on another act being completed prior to the act being performed.

Figure 5:
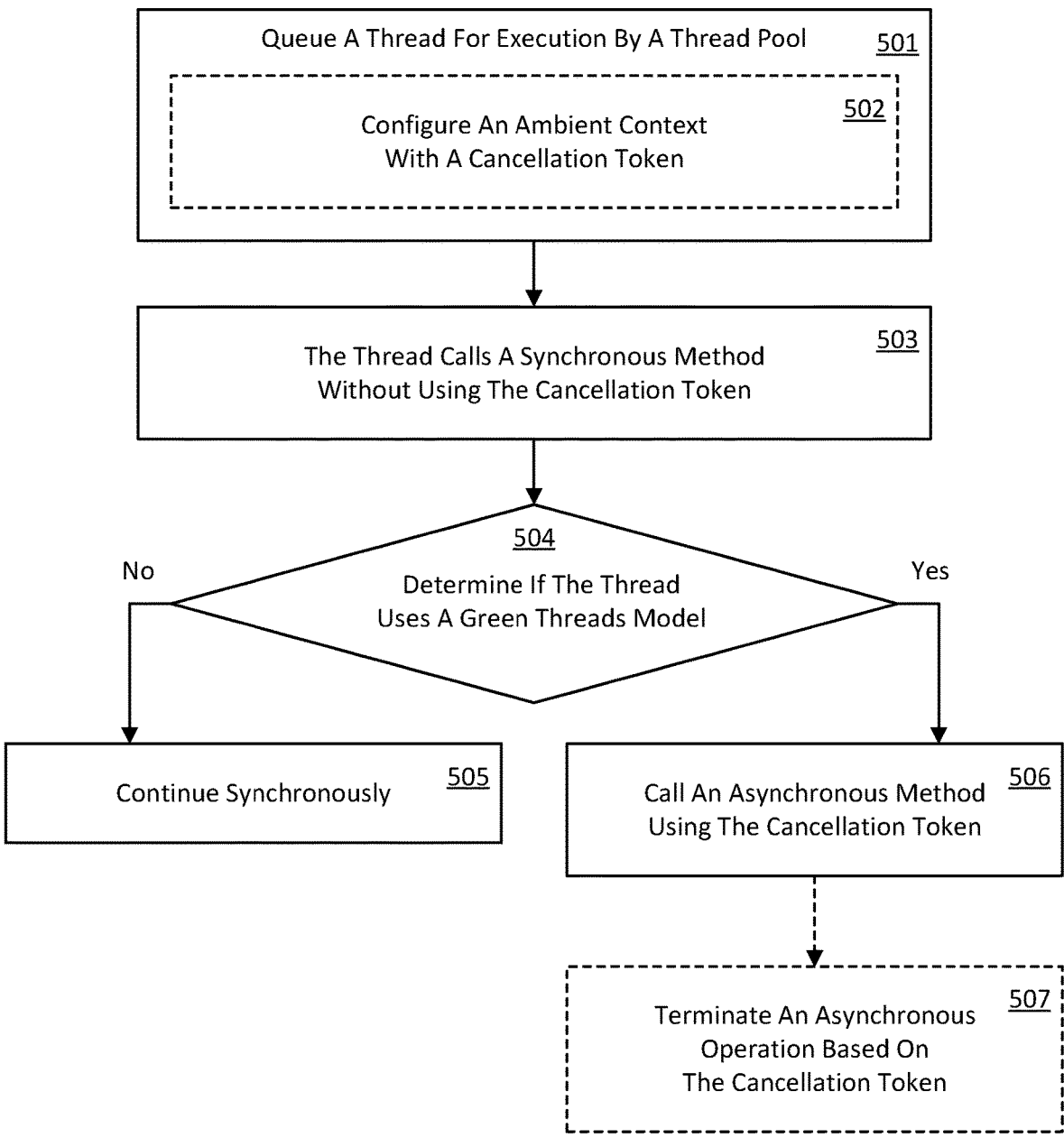
FIG. 5 illustrates a flow chart of an example of a method for utilizing ambient context to convert a synchronous operation to an asynchronous operation when the synchronous operation executes on a green thread.

Referring to FIG. 5, in embodiments, method 500 comprises act 501 of queuing a thread for execution by a thread pool. For example, language runtime 110 creates/queues a thread for execution on thread pool 112. This could be a thread that executes synchronous methods (e.g., synchronous thread 305). Alternatively, green thread creation component 115 could create/queue a green thread (green thread 407) that executes synchronous methods. In embodiments, the thread pool is managed by OS 109 or by language runtime 110.

In some embodiments, act 501 comprises act 502 of configuring an ambient context with a cancellation token. For example, when green thread creation component 115 creates green thread 407, ambient context component 116 configures an ambient context with a cancellation token. For example, thread context 408 of green thread 407 includes cancellation token 406.

In some embodiments, the cancellation token is generated by an entity that queues/creates the thread. For example, green thread creation component 115 creates the cancellation token and passes that token back to the caller. In other embodiments, the cancellation token is passed by a caller to a method that queues/creates the thread. For example, application thread 401 creates cancellation token 406 (create cancellation token 404) and passes cancellation token 406 to green thread creation component 115. In embodiments, configuring the ambient context includes configuring the ambient context with an indication that the thread uses the green threads model. For example, thread context 408 of green thread 407 includes thread type 409 (e.g., configured by the ambient context component 116).

As shown in act 503, the thread calls a synchronous method without using the cancellation token. For example, synchronous thread 305 calls synchronous method 308, or green thread 407 calls synchronous method 410. As a result, method 500 also comprises act 504 of determining if the thread uses a green threads model. In some embodiments, act 504 comprises, based on a call of a synchronous method by the thread, determining whether the thread uses a green threads model. In one example, based on a call to synchronous method 308, thread context 306 is used to determine that synchronous thread 305 is not a green thread (e.g., based on thread type 307). In another example, based on a call to synchronous method 410, thread context 408 is used to determine that green thread 407 is a green thread (e.g., based on thread type 409 or on the presence of cancellation token 406).

In some embodiments, act 504 is performed by language runtime 110 based on language runtime 110 identifying a call to a synchronous method. Thus, in embodiments, a language runtime identifies the cancellation token from the ambient context and calls the asynchronous method. In other embodiments, act 504 is performed by green thread logic 118 instrumented into a synchronous method. Thus, in embodiments, the synchronous method identifies the cancellation token from the ambient context and calls the asynchronous method.

In some embodiments, act 504 results in a determination that the thread does not use a green threads model. In some embodiments, determining that the thread does not use the green threads model is based on identifying the indication from the ambient context. For example, green thread logic 118 identifies thread type 307 in thread context 306. In some embodiments, determining that the thread does not use the green threads model is based on a lack of a cancellation token in the ambient context. For example, green thread logic 118 determines that thread context 408 lacks any cancellation token and infers by the lack of the token that green thread 407 is not a green thread.

In some embodiments, act 504 results in a determination that the thread uses a green threads model. In some embodiments, determining that the thread uses the green threads model is based on identifying the indication from the ambient context. For example, green thread logic 118 identifies thread type 409 in thread context 408. In some embodiments, determining that the thread uses the green threads model is based on identifying the cancellation token from the ambient context. For example, green thread logic 118 identifies cancellation token 406 in thread context 408 and infers by the presence of the token that green thread 407 is a green thread.

When it is determined in act 504 that the thread does not use a green threads model (e.g., the 'No' branch from act 504), method 500 also comprises act 505 of continuing synchronously. In some embodiments, act 505 comprises, based on the thread not using the green threads model performing a task of the synchronous method. For example, based on green thread logic 118 determining that synchronous thread 305 is not a green thread, synchronous method 308 continues with synchronous implementation 310.

When it is determined in act 504 that the thread uses a green threads model (e.g., the 'Yes' branch from act 504), method 500 also comprises act 506 of calling an asynchronous method using the cancellation token. In some embodiments, act 506 comprises, based on the thread using the green threads model, calling an asynchronous method that uses an asynchronous operation to perform a task of the synchronous method, including passing the asynchronous method the cancellation token.

In one example, based on language runtime 110 determining that green thread 407 is a green thread, language runtime 110 substitutes a call to synchronous method 410 with a call to asynchronous method 413, passing it cancellation token 406 from thread context 408. In another example, based on green thread logic 118 determining that green thread 407 is a green thread, synchronous method 410 calls asynchronous method 413, passing it cancellation token 406 from thread context 408. In either example, act 506 includes identifying the cancellation token from the ambient context.

After act 506, method 500 may also comprise act 507 of terminating an asynchronous operation based on the cancellation token. In some embodiments, act 507 comprises based on identifying a state change of the cancellation token, terminating the asynchronous operation. For example, based on application thread 401 calling a Cancel method of cancellation token 406, asynchronous method 413 identifies a signal from cancellation token 406 and terminates its asynchronous operation. In some embodiments, identifying the state change of the cancellation token is based on polling the cancellation token.

In embodiments, after act 507, the cancellation of the asynchronous operation is signaled to parent context(s) via an exception. Thus, in some embodiments, method 500 includes, based on terminating the asynchronous operation, propagating an exception to a context awaiting the thread.

Embodiments of the disclosure may comprise or utilize a special-purpose or general-purpose computer system (e.g., computer system 101) that includes computer hardware, such as, for example, a processor system (e.g., processor system 102) and system memory (e.g., memory 103), as discussed in greater detail below. Embodiments within the scope of the present disclosure also include physical and other computer-readable media for carrying or storing computer-executable instructions and/or data structures. Such computer-readable media can be any available media accessible by a general-purpose or special-purpose computer system. Computer-readable media that store computer-executable instructions and/or data structures are computer storage media (e.g., storage medium 104). Computer-readable media that carry computer-executable instructions and/or data structures are transmission media. Thus, embodiments of the disclosure can comprise at least two distinctly different kinds of computer-readable media: computer storage media and transmission media.

Computer storage media are physical storage media that store computer-executable instructions and/or data structures. Physical storage media include computer hardware, such as random access memory (RAM), read-only memory (ROM), electrically erasable programmable ROM (EEPROM), solid state drives (SSDs), flash memory, phasechange memory (PCM), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality.

Transmission media can include a network and/or data links that can carry program code in the form of computer-executable instructions or data structures and which can be accessed by a general-purpose or special-purpose computer system. A "network" is defined as one or more data links that enable the transport of electronic data between computer systems and other electronic devices. When information is transferred or provided over a network or another communications connection (either hardwired, wireless, or a combination thereof) to a computer system, the computer system may view the connection as transmission media. Combinations are included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., network interface 105) and then eventually transferred to computer system RAM and/or to less volatile computer storage media at a computer system. Thus, computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a method or group of functions. Computer-executable instructions may be, for example, binaries, intermediate format instructions such as assembly language, or even source code.

It will be appreciated that the disclosed systems and methods may be practiced in network computing environments with many types of computer system configurations, including personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. Embodiments of the disclosure may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

It will also be appreciated that the embodiments of the disclosure may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is a model for enabling on-demand network access to a shared pool of configurable computing resources (e.g., networks, servers, storage, applications, and services). A cloud computing model can be composed of various characteristics, such as on-demand self-service, broad network access, resource pooling, rapid elasticity, measured service, and so forth. A cloud computing model may also come in the form of various service models such as, for example, Software as a Service (Saas), Platform as a Service (PaaS), and Infrastructure as a Service (IaaS). The cloud computing model may also be deployed using different deployment models such as private cloud, community cloud, public cloud, hybrid cloud, and so forth.

Some embodiments, such as a cloud computing environment, may comprise a system that includes one or more hosts capable of running one or more virtual machines. During operation, virtual machines emulate an operational computing system, supporting an OS and perhaps one or more other applications. In some embodiments, each host includes a hypervisor that emulates virtual resources for the virtual machines using physical resources that are abstracted from the view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources include processing capacity, memory, disk space, network bandwidth, media drives, and so forth.

Although the subject matter has been described in language specific to structural features and/or methodological acts, it is to be understood that the subject matter defined in the appended claims is not necessarily limited to the described features or acts described supra or the order of the acts described supra. Rather, the described features and acts are disclosed as example forms of implementing the claims.

The present disclosure may be embodied in other specific forms without departing from its essential characteristics. The described embodiments are to be considered in all respects only as illustrative and not restrictive. All changes which come within the meaning and range of equivalency of the claims are to be embraced within their scope.

When introducing elements in the appended claims, the articles "a," "an," "the," and "said" are intended to mean there are one or more of the elements. The terms "comprising," "including," and "having" are intended to be inclusive and mean that there may be additional elements other than the listed elements. Unless otherwise specified, the terms "set," "superset," and "subset" are intended to exclude an empty set, and thus "set" is defined as a non-empty set, "superset" is defined as a non-empty superset, and "subset" is defined as a non-empty subset. Unless otherwise specified, the term "subset" excludes the entirety of its superset (i.e., the superset contains at least one item not included in the subset). Unless otherwise specified, a "superset" can include at least one additional element, and a "subset" can exclude at least one element.

What is claimed:

1. A method implemented in a computer system that includes a processor system comprising:
    queuing a first thread for execution by a thread pool, including configuring a first ambient context of the first thread with a cancellation token;
    based on a first call of a first synchronous method by the first thread,
    determining that the first thread uses a green threads model; and identifying the cancellation token from the first ambient context;
        based on the first thread using the green threads model, calling an asynchronous method that uses an asynchronous operation to perform a first task of the first synchronous method, including passing the asynchronous method the cancellation token;
    based on identifying a state change of the cancellation token, terminating the asynchronous operation;
    queuing a second thread for execution by the thread pool, the second thread having a second ambient context;
    based on a second call of a second synchronous method by the second thread, determining that the second thread does not use the green threads model; and
    based on the second thread not using the green threads model, performing a second task of the second synchronous method.

2. The method of claim 1, wherein the thread pool is an input/output thread pool.

3. The method of claim 1, wherein the cancellation token is passed to a method that queues the first thread.

4. The method of claim 1, wherein the cancellation token is generated by a method that queues the first thread.

5. The method of claim 1, wherein,
    the method further comprises configuring the first ambient context with an indication that the first thread uses the green threads model, and
    determining that the first thread uses the green threads model is based on identifying the indication from the first ambient context.

6. The method of claim 1, wherein determining that the first thread uses the green threads model is based on identifying the cancellation token from the first ambient context.

7. The method of claim 1, wherein the method further comprises, based on terminating the asynchronous operation, propagating an exception to a context awaiting the first thread.

8. The method of claim 1, wherein the method further comprises identifying the state change of the cancellation token based on polling the cancellation token.

9. The method of claim 1, wherein the first synchronous method identifies the cancellation token from the first ambient context and calls the asynchronous method.

10. The method of claim 1, wherein a language runtime identifies the cancellation token from the first ambient context and calls the asynchronous method.

11. A computer system comprising:
    a processor system; and
    a computer storage medium that stores computer-executable instructions that are executable by the processor system to at least:
    create a first thread for execution by a thread pool, including configuring a first ambient context of the first thread with a cancellation token;
    based on a first call of a first synchronous method by the first thread:
    determine that the first thread uses a green threads model; and
    identify the cancellation token from the first ambient context;
        based on the first thread using the green threads model, call an asynchronous method that uses an asynchronous operation to perform a first task of the first synchronous method, including passing the asynchronous method the cancellation token;
    based on identifying a state change of the cancellation token, terminate the asynchronous operation;

create a second thread for execution by the thread pool, the second thread having a second ambient context;

based on a second call of a second synchronous method by the second thread, determine that the second thread does not use the green threads model; and based on the second thread not using the green threads model, perform a second task of the second synchronous method.

12. The computer system of claim 11, wherein the cancellation token is passed to a method that creates the first thread.

13. The computer system of claim 11, wherein the cancellation token is generated by a method that creates the first thread.

14. The computer system of claim 11, wherein, the computer-executable instructions are also executable by the processor system to configure the first ambient context with an indication that the first thread uses the green threads model, and determining that the first thread uses the green threads model is based on identifying the indication from the first ambient context.

15. The computer system of claim 11, wherein determining that the first thread uses the green threads model is based on identifying the cancellation token from the first ambient context.

16. The computer system of claim 11, wherein the computer-executable instructions are also executable by the processor system to, based on terminating the asynchronous operation, propagate an exception to a context awaiting the first thread.

17. The computer system of claim 11, wherein the computer-executable instructions are also executable by the processor system to identify the state change of the cancellation token based on polling the cancellation token.

18. The computer system of claim 11, wherein the first synchronous method identifies the cancellation token from the first ambient context and calls the asynchronous method.

19. The computer system of claim 11, wherein a language runtime identifies the cancellation token from the first ambient context and calls the asynchronous method.

20. A computer-readable storage medium that stores computer-executable instructions that are executable by a processor system to at least:

create a first thread for execution by a thread pool, including configuring a first ambient context of the first thread with a cancellation token;

based on a first call of a first synchronous method by the first thread:

determine that the first thread uses a green threads model; and identify the cancellation token from the first ambient context;

based on the first thread using the green threads model, call an asynchronous method that uses an asynchronous operation to perform a first task of the first synchronous method, including passing the asynchronous method the cancellation token;

based on identifying a state change of the cancellation token, terminate the asynchronous operation;

create a second thread for execution by the thread pool, the second thread having a second ambient context;

based on a second call of a second synchronous method by the second thread, determine that the second thread does not use the green threads model; and based on the second thread not using the green threads model, perform a second task of the second synchronous method.

* * * * *